United States Patent Office

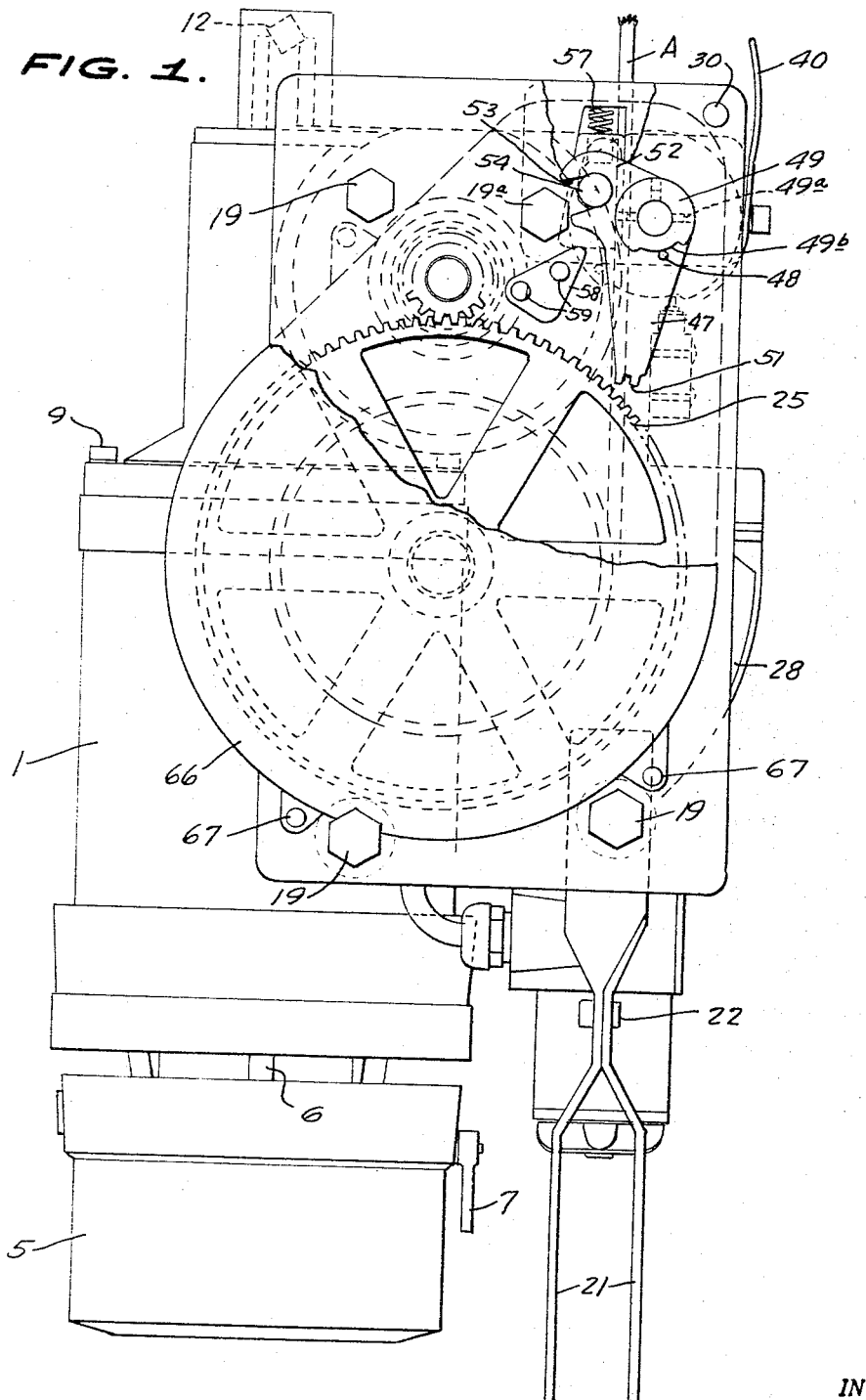

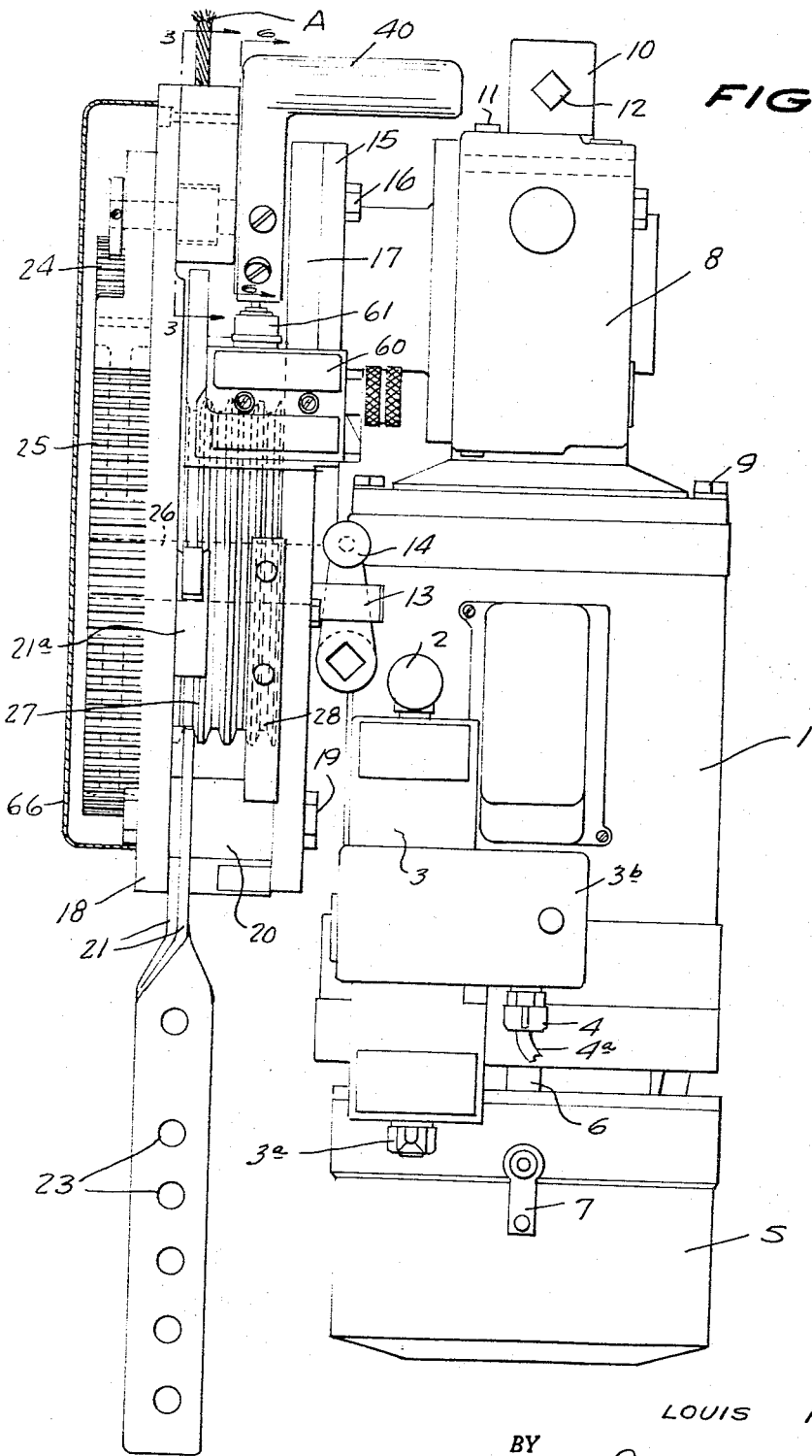

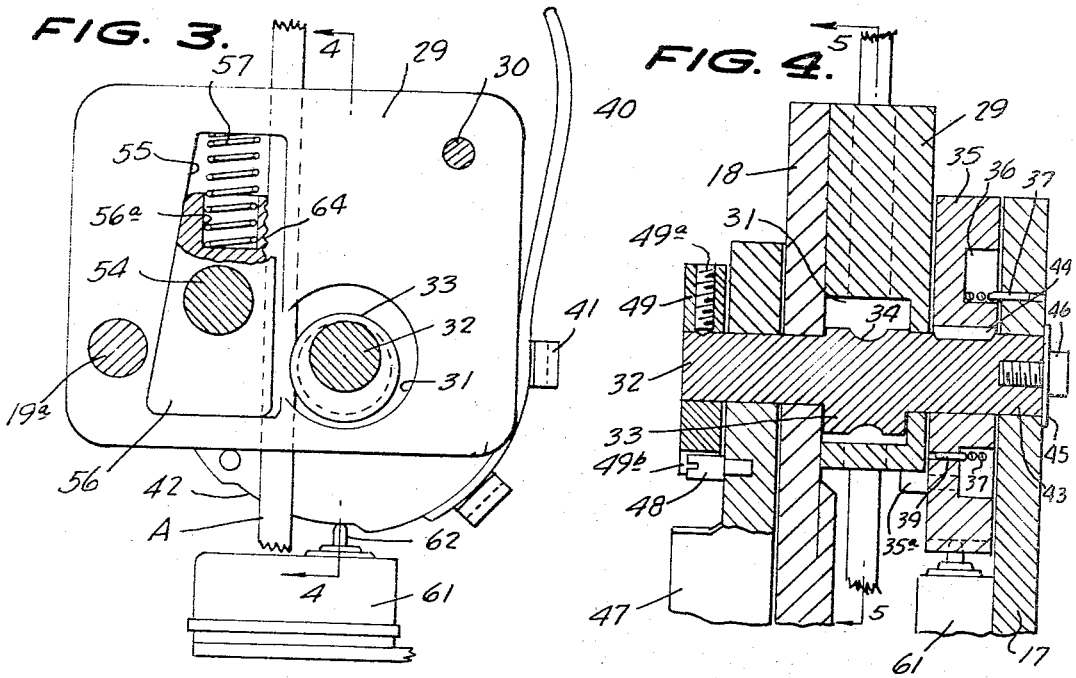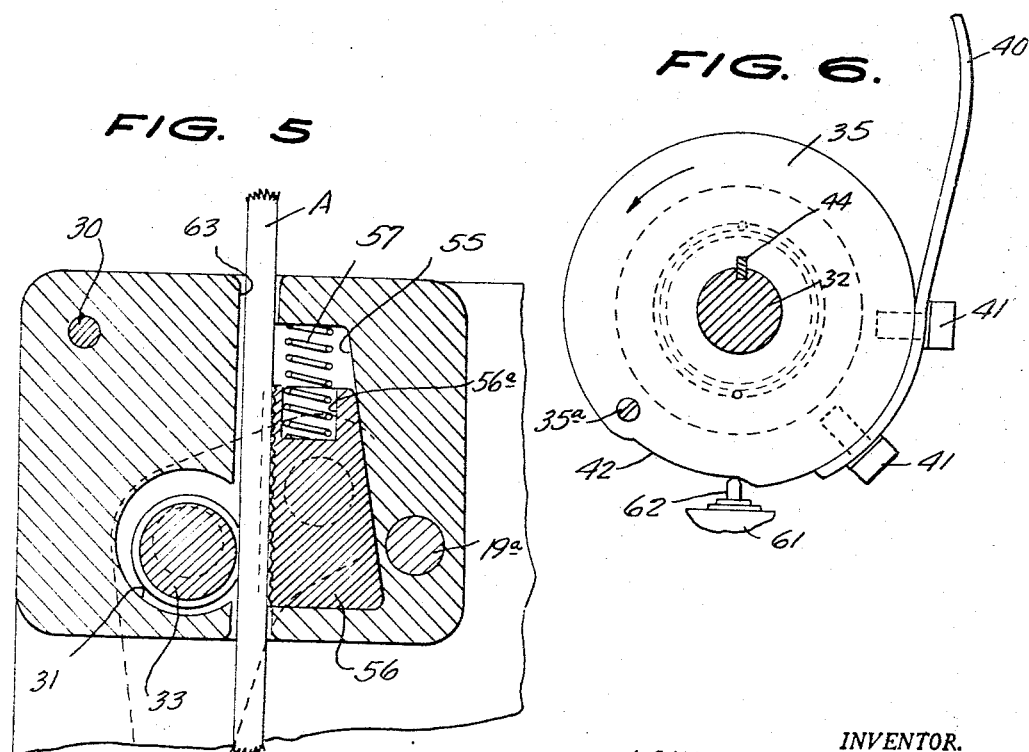

3,333,822
Patented Aug. 1, 1967

3,333,822
ELECTRIC HOIST
Louis Horvath, 1653 Chattanooga Ave.,
Youngstown, Ohio 44514
Filed July 29, 1966, Ser. No. 568,801
8 Claims. (Cl. 254—156)

The present invention is related to electric hoists and is more particularly concerned with an electrically operated device for moving a load upwardly and downwardly along suspended cable.

The principal object of the present device is to provide an electrically driven and controlled device capable of moving loads along the length of a cable and which device has a plurality of safety mechanisms therein which will automatically engage the cable and a driving gear of the device in such a manner in the event of slippage of the device along the cable when not in operation, to provide a slowing down and complete stoppage of the device on the cable and which safety mechanisms must be manually released by an operator to permit the further driving of the device along the cable.

A further and important object of the invention is to provide an electrically driven hoist capable of being used alone or with other similar hoists for raising and lowering various types of loads quickly and readily along suspended cable and in the event of an electrical power failure to the hoist the same may be manually controlled and operated.

Further objects of the invention will be in part obvious and in part pointed out in the following detailed description of the accompanying drawings, in which;

FIG. 1 is a front view of the present device partly broken away and attached to a cable in its operative position;

FIG. 2 is a side view of the present device partly in cross-section;

FIG. 3 is an enlarged front view partly in section of the safety stop forming part of the present device attached to a cable;

FIG. 4 is a cross-sectional view taken on line 4—4 of FIG. 3;

FIG. 5 is a cross-sectional view taken on line 5—5 of FIG. 4;

And FIG. 6 is a cross-sectional view taken on line 6—6 of FIG. 4.

Referring now more particularly to the accompanying drawings wherein like and corresponding parts are designated by similar reference characters, numeral 1 indicates a single phase reversible electric motor, while 2 indicates the knob for controlling a conventional electrical direction reversing switch 3 connected to said motor, 3a indicates the control knob for a conventional switch connected to said motor for adapting the same to use with various voltages of current, for example 115 v. or 230 v., 3b is a box containing the wiring for the electrical elements of the hoists and 4 is a socket connecting cable 4a, attachable to a source of electrical current (not shown), to the wiring in box 3b.

A conventional electrically operated disc brake 5 is attached to shaft 6 of said electric motor for retaining the same against rotation when necessary and has a manual release handle 7 for use when there is a failure in the supply of electrical current to cable 4a so that the hoist can be operated manually.

A right angle gear drive 8 is mounted on motor 1 and attached thereto by screws 9 and is operatively connected to shaft 6 of said motor. A second right angle gear drive 10 is mounted upon drive 8 and attached thereto by screws 11 and is also operatively connected to drive 8 and has a squared operating shaft 12 extending outwardly thereof. A clip 13 detachably supports a crank 14 which in times of emergency can be attached to shaft 12 for the manual operation of the hoist in the case of an electrical power failure thereto. Said clip 13 is attached to a plate 17 which also has base 15 of drive 8 attached thereto by bolts 16.

A second plate 18 is attached to plate 17 by nuts and bolts 19 which also extends through tubular spacers 20 between said plates spacing the same apart and parallel to one another.

A pair of straps 21 are positioned between the lower spacer 20 and plate 18 with the lower bolt 19 extending therethrough. Said straps are further joined together by nut and bolt 22 and have a series of openings 23 along their length for attachment to a load (not shown) to be carried by the present device such as for example a Bosun's chair, climber basket, scaffolding or the like as well as other types of loads to be conveyed along a cable.

A pinion 24 is fixedly connected to drive 8 for being rotated thereby and meshes with a ring gear 25. A shaft 26 is rotatably mounted through plates 17 and 18 and has ring gear 25 fixedly mounted thereon as is a drum 27 with grooves in its periphery.

A tension roller assembly 28 is connected to plate 17 for guiding cable A around said drum. A stop 21a is fixedly carried by plate 18 and extends through straps 21 as shown in FIG. 2 of the drawings.

A block 29 is attached to the upper end of plate 18 by a nut and bolt 19a and a bolt 30. Said block has an annular recess 31 closed by plate 18. A stub shaft 32 extends through said block, said block recess and plate 18 being rotatably supported thereby and has an off-set cam 33 integral with said stub shaft. The periphery of said cam has an annular groove 34 in its periphery capable of receiving a portion of cable A therein.

A roller 35 has a stop 35a extending from its inner face and an annular recess 36 in its outer face in which is positioned a coil spring 37 having one end 38 embedded in plate 17 and a second end 39 embedded in said roller tending to hold stop 35a against block 29. An L-shaped handle 40 is attached to said roller by bolts 41. Said roller 35 has a peripheral recess 42 provided by a reduced portion of said roller. An end 43 of stub shaft 32 and said roller are keyed together by a key 44 retained by washer 45 and bolt 46 in threaded engagement with said stub shaft.

A pawl 47 is pivotally mounted on the other end of said stub shaft while a screw 48 extends from said pawl. A cam 49 is fixedly attached to said stub shaft by a plurality of set screws 49a and has a peripheral recess 49b with screw 48 positioned within said recess 49b.

Pawl 47 is of an inverted L-shaped configuration having teeth 51 in the end of one leg thereof adjacent ring gear 25 and a second leg 52 with an end recess 53. A stub shaft 54 integral with block 56 extends laterally of said block and into said recess 53. Block 29 has an elongated recess 55 of which one side is tapered and block 56 is slideable in said recess and has a tapered side abutting the tapered side of said recess. A coil spring 57 is seated within the top recess 56a of block 56 and bears against the top of recess 55 tending to retain block 56 at the bottom or lowermost portion of recess 55.

A stop 58 is attached by rivets 59 to plate 18 and positioned for limiting the pivoting movement of pawl 47 to the left of FIG. 1. A terminal box 60 is connected to plate 17 and supports a normally open micro-switch 61 thereon having an operating plunger 62, which plunger normally engages the periphery of roller 35 within recess 42 for leaving said mro-switch open until handle 40 is pivoted to the left of FIG. 3, or 6 when said plunger is depressed by roller 35 closing said micro-switch. When micro-switch 61 is in its normally open position it activates brake 5 and disconnects the current from motor 1 stopping the rotation of drum 27. However, when handle 40 is pivoted to the left of FIGS. 3 or 6 closing said micro-switch it releases brake 5 and connects motor 1 to the source of current permitting the operation thereof as desired.

Block 29 has a cylindrical opening 63 extending the height thereof which opening opens into recesses 31 and 55 and is of a diameter for slideably receiving cable A therethrough so that the cable can pass downwardly and around drum 27. Block 56 has diagonal teeth 64 in the groove 65 extending longitudinally of the straight side thereof and the groove 65 has cable A normally slideably riding therein.

A cover 66 encases gears 24 and 25 and is attached to plate 18 by bolts 67.

In the operation of the present invention, cable A is passed through opening 63 to and around drum 27 in the grooves thereof and can hang downwardly from said drum. The upper end of cable A is attached by any support (not shown) so that the same hangs therefrom. The load, such as the scaffolding, basket, Bosun chair, or the like is attached to straps 21 by fastening ropes or cables (not shown) from the load through the openings 23. In the case of a scaffolding, for example, two of the present hoists can be used each connected to the opposite ends of the scaffolding. As a result the present hoist will extend from the cable A, for example, in the position shown in the drawings.

After connecting cable 4a to a source of electrical current, knob 2 is moved to set its switch so that drive motor 1 will rotate to move the hoist up or down cable A as desired. Thereupon lever 40 is pushed closing micro-switch 61 and the drive motor will then turn pinion 24, gear wheel 25 and drum 27 whereupon the drum will wind cable A thereon for moving the hoist upwardly or downwardly of said cable depending upon the direction of drive of the motor 1 selected.

Upon releasing handle 40 spring 37 normally retains handle 40 in the position shown in the drawings with the result that plunger 62 enters recess 42 opening micro-switch 61 and disconnects the current from motor 1 and activates brake 5 to its braking position preventing the rotation of shaft 6 and thus drum 27. Therefore, an operator must move handle 40 to the left of FIGS. 1, 3, and 6 against spring 37 turning roller 35 whereupon plunger 62 is depressed by said roller so that the micro-switch 61 will then connect motor 1 to the source of current activating the same and releasing brake 5 whereupon drum 27 will rotate. Thus the operator must keep his hand on handle 40 at all times for moving the device along cable A.

With the handle 40 in its motor operating position the left end of cam recess 49b is moved against screw 48 moving pawl 47 away from gear wheel 25. When lever 40 is released cam 33 moves to a position as shown in FIG. 3 for contacting cable A pushing the same against block 56 and micro-switch 61 operates brake 5 and the entire hoist is slowed down in its movement along the cable A. However, if the device does not stop properly at the required position on the cable with the result that the device starts drifting downwardly and cable A moves upwardly of recess 63, teeth 64 of block 56 will engage the cable and block 56 will move upwardly against spring 57 and due to the slanting side 55 increases its grip on said cable clamping the cable between cam 33 and block 56.

The release of lever 40 and movement of cam 33 against cable A moves the left end of recess 49b of FIG. 1 away from screw 48 releasing pawl 47 and the upward movement of block 56 through stub axle 54 pivots pawl 47 so that its teeth 51 engage the teeth of gear wheel 25 and upon the pawl 47 abutting stop 58 prevents the rotation of the gear wheel so that the device is automatically stopped at a definite position relative to said cable.

To disengage teeth 57 from said gear wheel it is necessary to push lever 40 to its operating position whereupon cam 49 kicks pawl 47 from gear 25 and until this is done the unit cannot be started. Also upon moving lever 40 to the left of FIG. 1 cam 33 will be moved from said cable and which allows block 56 under the pressure of spring 57 to move from said cable releasing the same.

At any time there is a failure of electrical current supply to the motor 1, handle 14 can be detached from clip 13 and attached to shaft 12 and lever 7 moved to release brake 5 whereupon the device can be manually operated by turning said crank.

The present invention is capable of considerable modifications and such changes thereto as come within the scope of the appended claims is deemed to be a part thereof.

I claim:

1. A load carrying device for moving along a cable comprising a frame capable of attachment to a load to be supported thereby, a driven gear wheel rotatably mounted on said frame, a cable drum operatively connected to said gear wheel for rotation therewith, a block mounted on said frame, a shaft rotatably mounted through said block, said block having a first recess, an elongated recess with a slanting side and a cylindrical opening for the cable extending between and communicating with both of said recesses, a cam carried by said shaft for rotation therewith within said first recess and capable of at times engaging the cable in said block opening, a second block slideably positioned in said elongated recess having a slanting side positioned on said elongated recess slanting side and an opposite toothed side positioned in said first block opening, a pawl pivotally carried by said shaft capable of engaging said gear wheel for stopping the same and having a recess and a stub axle carried by said second block and extending into said pawl recess.

2. A load carrying device for moving along a cable as claimed in claim 1 including a handle fixedly connected to said shaft and resilient means connected to said handle and said frame tending to retain said cam away from said first block opening.

3. A load carrying device for moving along a cable as claimed in claim 1 including a roller fixedly connected to said shaft, a handle attached to said roller, resilient means attached to said roller and said frame, electrically operated drive and brake means for driving and stopping said gear wheel, a switch operating said drive and brake means operatively controlled by said roller.

4. A load carrying device for moving along a cable as claimed in claim 1 including a stop on said pawl, a second cam carried by said shaft for rotation therewith and capable of engaging said pawl for positioning said pawl away away from said gear wheel.

5. A load carrying device for moving along a cable as claimed in claim 1 including a roller fixedly connected to said shaft, a handle attached to said roller, resilient means connecting said roller and said frame, electrically operated drive and brake means for driving and stopping said gear wheel, a switch electrically connected to said drive and brake means for controlling the same and having a control member engaging the periphery of said roller and said roller periphery having a recess for receiving said switch control member at times for changing said switch.

6. A load carrying device for moving along a cable as claimed in claim 1 including electrically operated driving means for rotating said gear wheel and manually operable driving means connected to said electrically operated gear wheel in the event electrical current is not available.

7. A load carrying device for moving along a cable as claimed in claim 1 wherein said frame includes a pair of connected spaced apart plates with said first block attached to one of said plates, a second shaft is rotatably mounted on said plates and has said gear wheel and said cable drum mounted thereon for rotation therewith and electrically operated drive and brake means operatively connected to said gear wheel for driving the same is mounted on and extends alongside the other of said plates.

8. In an electric hoist having a driven gear wheel operatively connected to a cable drum, a cable lock comprising a block mounted on the hoist having a first recess, an elongated recess with a slanting side and a cable passage extending therebetween and having side openings in both of said recesses, a shaft rotatably mounted through said block, a cam carried by said shaft within said first recess for rotation with said shaft and capable of at times extending into said cable passage, a second block slideably mounted in said elongated recess having a slanting side slideably mounted on said recess slanting side and an opposite toothed side capable of at times extending into said cable passage, resilient means tending to retain said second block from said cable passage, a stub axle carried by said second block, a pawl pivotally mounted on said shaft and positioned for at times engaging the teeth of said gear wheel and having a recess with said stub axle extending therein, a stop limiting the pivoting of said pawl and resiliently loaded means tending to retain said cam from said cable passage.

References Cited

UNITED STATES PATENTS

| | | | |
|---|---|---|---|
| 2,508,187 | 5/1950 | Niemiec | 254—167 |
| 2,922,623 | 1/1960 | Simmons | 254—156 |

EVON C. BLUNK, *Primary Examiner.*

H. C. HORNSBY, *Assistant Examiner.*